United States Patent
Nelson et al.

(10) Patent No.: US 8,036,701 B2
(45) Date of Patent: Oct. 11, 2011

(54) DYNAMICALLY RECONFIGURABLE BASE STATION NODE AND METHOD

(75) Inventors: Paul G. Nelson, Frisco, TX (US); Anuradha K. Appaji, Plano, TX (US); Joseph R. Cleveland, Richardson, TX (US); Warren T. Pottenger, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1127 days.

(21) Appl. No.: 10/795,112

(22) Filed: Mar. 5, 2004

(65) Prior Publication Data

US 2005/0197135 A1    Sep. 8, 2005

(51) Int. Cl.
*H04W 4/00* (2009.01)
(52) U.S. Cl. ............. 455/552.1; 455/517; 455/450; 455/561; 370/328
(58) Field of Classification Search .......... 455/422.1, 455/450, 552.1, 517, 561; 370/328
See application file for complete search history.

(56) References Cited

U.S. PATENT DOCUMENTS

2003/0078037 A1* 4/2003 Auckland et al. ............. 455/422
2004/0116153 A1* 6/2004 Kaminski et al. .......... 455/552.1

OTHER PUBLICATIONS

Apr. 19, 2001). Advanced Communications Technologies Inc.—SpectruCell-SDR-Base Station Presents Solution to US 3G Spectrum Rollout and Allocation Woes the Free Library. (2001). Retrieved Aug. 27, 2009 from http://www.thefreelibrary.com/Advanced Communications Technologies Inc.—SpectruCell-SDR-Base . . . -a073387980.*
David Farber, IP: SpectruCell Takes on Qualcomm, Part I, Sep. 26, 2001, "http://www.interesting-people.org/archives/interesting-people/200109/msg00367.html".*

* cited by examiner

*Primary Examiner* — Pierre-Louis Desir (57) ABSTRACT

A base station node is provided that includes a radio frequency (RF) monitor and at least one signal processor. The RF monitor is operable to monitor traffic associated with a plurality of wireless communication devices to determine at least one requested load having a corresponding air interface standard. The signal processor is coupled to the RF monitor and is operable to be dynamically reconfigured to support the air interface standard corresponding to the requested load.

23 Claims, 5 Drawing Sheets

DYNAMICALLY RECONFIGURABLE BASE STATION NODE AND METHOD

TECHNICAL FIELD OF THE INVENTION

The present invention relates generally to wireless network base stations and, more specifically, to a dynamically reconfigurable base station node and method.

BACKGROUND OF THE INVENTION

Wireless communication systems have become ubiquitous in society. Business and consumers use a wide variety of fixed and mobile wireless devices, including cell phones, pagers, Personal Communication Services (PCS) systems, and fixed wireless access devices (e.g., vending machines with cell phone capability).

Wireless communication networks generally include base stations that support a single air interface standard for communicating with the wireless devices. A separate overlay of additional hardware is needed to support each additional air interface standard, which increases costs and deployment times. Some wireless communication providers use reconfigurable baseband processing components in base stations. However, even these base stations are configured once and are operated in a static-configuration mode.

Therefore, there is a need in the art for wireless communication networks that implement flexible architectures that may be readily adapted to changes in air interface standards. In particular, there is a need for an improved wireless network architecture in which infrastructure equipment may be reconfigured to adapt to changing air interface standards.

SUMMARY OF THE INVENTION

In accordance with the present invention, a dynamically reconfigurable base station node and method are provided that substantially eliminate or reduce disadvantages and problems associated with conventional systems and methods.

According to one embodiment of the present invention, a base station node is provided that includes a radio frequency (RF) monitor and at least one signal processor. The RF monitor is operable to monitor traffic associated with a plurality of wireless communication devices to determine at least one requested load having a corresponding air interface standard. The signal processor is coupled to the RF monitor and is operable to be dynamically reconfigured to support the air interface standard corresponding to the requested load.

According to another embodiment of the present invention, a base station node is provided that includes a wireless access protocol searcher and at least one signal processor. The searcher is operable to search for traffic associated with a plurality of communication devices to determine at least one requested load having a corresponding air interface standard. The signal processor is coupled to the searcher and is operable to be dynamically reconfigured to support the air interface standard corresponding to the requested load.

According to another embodiment of the present invention, a wireless network comprising a plurality of wireless communication devices is provided. The wireless network includes at least one dynamically reconfigurable base station node and a load manager. The base station node comprises an RF monitor and at least one signal processor. The RF monitor is operable to monitor traffic associated with the wireless communication devices to determine at least one requested load having a corresponding air interface standard and to provide requested load information to the load manager, the requested load information identifying the requested load, and the signal processor is operable to be dynamically reconfigured to support the air interface standard corresponding to the requested load. The load manager is operable to communicate with the base station node and to dynamically reconfigure the base station node based on the requested load information.

According to yet another embodiment of the present invention, a method for dynamically reconfiguring a base station node is provided. The method is for use in a wireless network comprising at least one dynamically reconfigurable base station node and a plurality of wireless communication devices. The method includes monitoring traffic and access requests for the wireless communication devices to determine requested loads, each requested load having a corresponding air interface standard. A determination is made regarding whether or not the requested loads are installed in the base station node. The base station node is configured with the requested loads by installing the requested loads in the base station node when the requested loads are not installed in the base station node.

According to still another embodiment of the present invention, a method for dynamically reconfiguring a base station node is provided. The method is for use in a wireless network comprising a plurality of dynamically reconfigurable base station nodes and a plurality of wireless communication devices. The method includes receiving at least one of an updated and a new load, each received load having a corresponding air interface standard. A determination is made regarding whether or not any of the base station nodes are to be updated based on the received load. The base station node is configured with the received load by installing the received load in the base station node when the received load is not installed in the base station node.

Technical advantages of one or more embodiments of the present invention include providing an improved base station node. In a particular embodiment, the base station node is dynamically reconfigurable with regard to air interface standards. As a result, the base station node may be dynamically modified in response to user demand, independent of other base station nodes in a wireless network. In addition, the base station nodes may be adapted to use new or modified air interface standards without the need for additional hardware. Accordingly, revenues for the service provider are maximized and air interface standards may be updated or added rapidly and inexpensively.

Other technical advantages will be readily apparent to one skilled in the art from the following figures, description, and claims.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
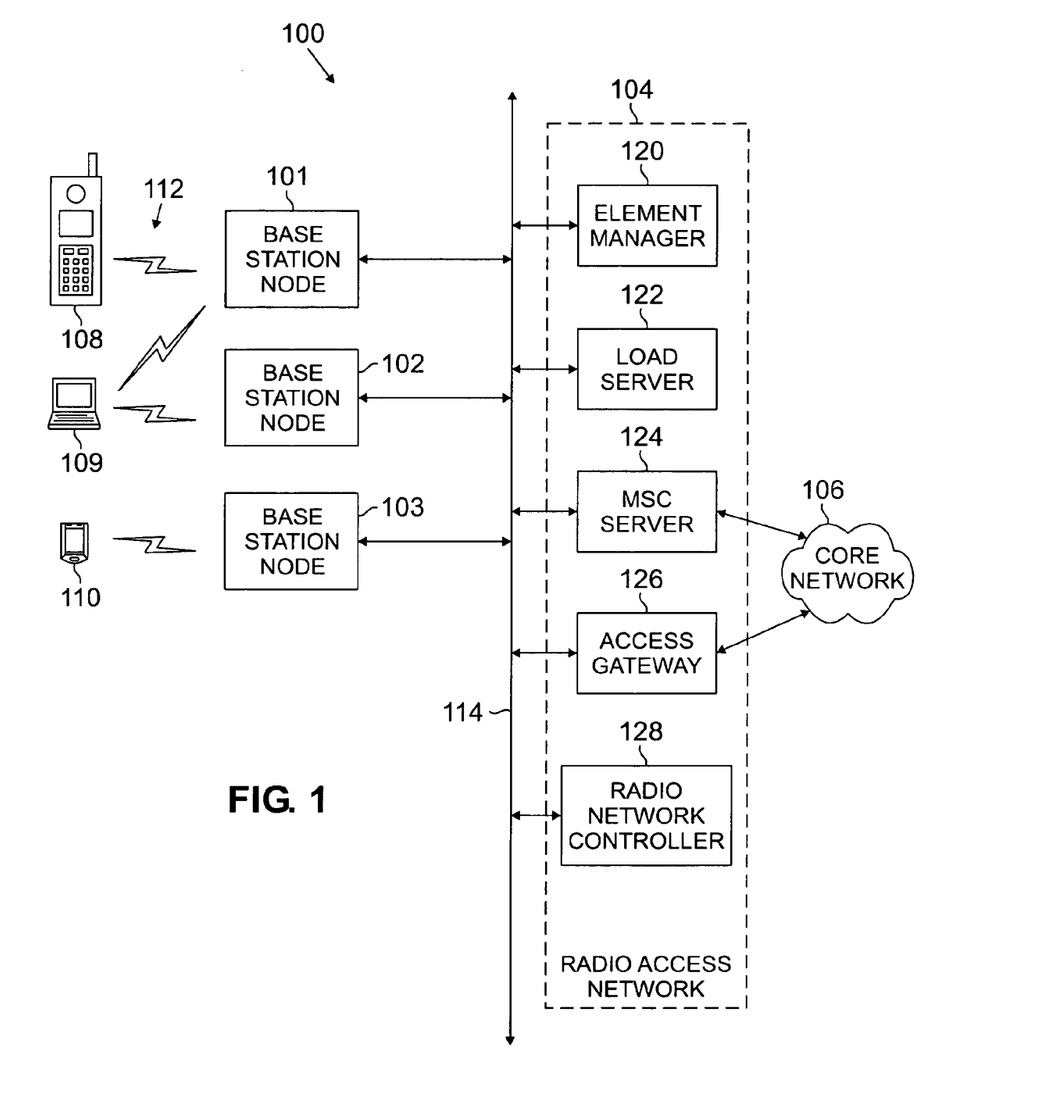
FIG. 1 is a block diagram illustrating a general overview of a wireless network according to one embodiment of the present invention.

FIG. 1 is a block diagram illustrating a general overview of a wireless network 100 according to one embodiment of the present invention. According to one embodiment, the wireless network 100 forms a cellular telecommunication network. The wireless network 100 may comprise an Internet Protocol network, an Asynchronous Transfer Mode network, a circuit switched network, or any other suitable type of wireless voice, data or voice/data network.

The wireless network 100 comprises a plurality of base station nodes 101-103, a radio access network 104, and a core network 106. The base station nodes 101-103 are each operable to communicate with one or more wireless communication devices 108, 109, and 110 over an air interface 112 and to communicate with the radio access network 104 over communication lines 114. As used herein, "each" means every one of at least a subset of the identified items.

Each of the wireless communication devices 108-110 may comprise a mobile wireless device, such as a cell phone, a PCS handset, a personal digital assistant (PDA) handset, a portable computer, a telemetry device, or the like, or any other suitable device operable to communicate with one of the base station nodes 101-103 via the air interface 112, including a stationary wireless device. Each of the base station nodes 101-103 is operable to communicate with the wireless communication devices 108-110 using one or more air interface standards.

According to one embodiment of the present invention, each of the base station nodes 101, 102, 103 comprises a base station controller and one or more base transceiver subsystems. A base station controller is a device that manages wireless communications resources, including the base transceiver subsystems, for specified cells within a wireless communications network. A base transceiver subsystem comprises RF transceivers, antennas, and other electrical equipment. This equipment may include air conditioning units, heating units, electrical supplies, telephone line interfaces and RF transmitters and RF receivers. For the purpose of simplicity and clarity in explaining the operation of the present invention, the base transceiver subsystems and the base station controller associated with each base transceiver subsystem are collectively represented by the base station nodes 101, 102 and 103.

The communication lines 114 are operable to provide a communication path for signals transmitted between the base station nodes 101-103 and components within the radio access network 104. The communication lines 114 may comprise any suitable connection means, such as a T1 line, a T3 line, a fiber optic link, a network packet data backbone connection, or any other type of data connection. The interface of the radio access network 104 to the core network 106 is independent of the air interface standards used by the base station nodes 101-103 to communicate with the wireless communication devices 108-110.

According to one embodiment, the radio access network 104 may comprise an element manager 120, a load server 122, a mobile switching center (MSC) server 124, an access gateway 126, and a radio network controller 128. It will be understood that the radio access network 104 may comprise other suitable components without departing from the scope of the present invention. Radio access network 104 communicates with mobile switching center (MSC) server 124, access gateway 126 and radio network controller 128 using a protocol that is suitable for the air interface established between radio access network 104 and communication devices 108-110.

The element manager 120 is operable to manage channel elements in the wireless network 100. As described in more detail below, the load server 122 is operable to dynamically reconfigure a base station node 101, 102 and/or 103 based on traffic and to update the base station nodes 101-103 with new or modified standards for wireless communication. In addition, although the load server 122 is illustrated in the radio access network 104, it will be understood that the load server 122 may be located in the core network 106 or any other suitable location without departing from the scope of the present invention.

The base station nodes 101-103 are operable to transfer voice and/or data signals between each other and the public switched telephone network (PSTN) (not shown) via the communication lines 114 and the MSC server 124. The MSC server 124 comprises a switching device that is operable to provide services for and coordination between the subscribers in the wireless network 100 and external networks, such as the PSTN or Internet.

The base station nodes 101-103 are also operable to transfer data signals to and receive data signals from the Internet (not shown) via the communication lines 114 and the access gateway 126. As described in more detail below, the radio network controller 128 is operable to maintain and control systems and components within the radio access network 104.

Figure 2:
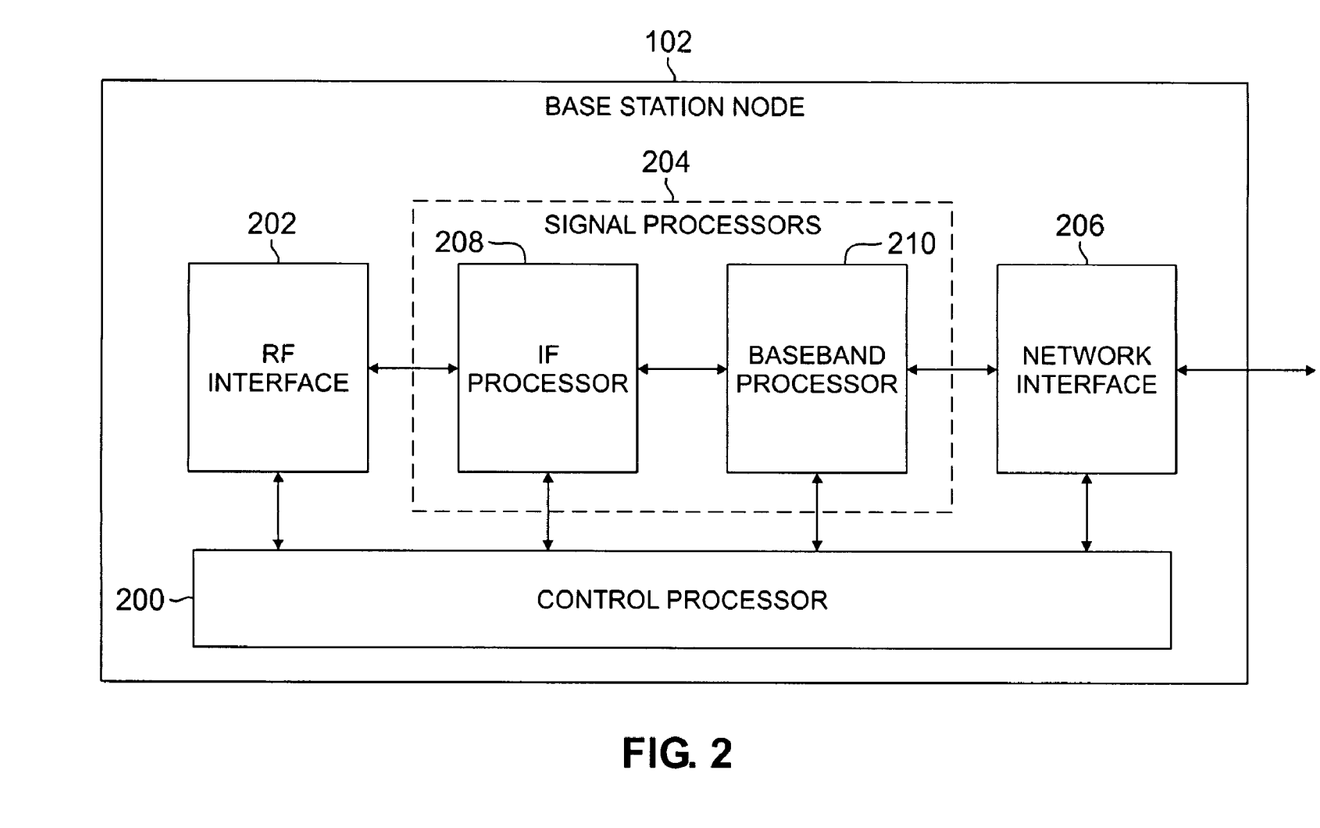
FIG. 2 is a block diagram illustrating one of the base station nodes of FIG. 1 according to one embodiment of the present invention.

FIG. 2 is a block diagram illustrating one of the base station nodes 101-103 according to one embodiment of the present invention. The base station node 102 is illustrated as an example. However, it will be understood that the components illustrated and described with respect to the base station node 102 are also part of the base station nodes 101 and 103.

As described in more detail below, the base station node 102 is operable to monitor the traffic associated with the wireless communication devices 108-110 that are requesting communication through that base station node 102 in order to determine which load or loads are being requested for that communication. The base station node 102 is also operable to provide this requested load information to a load manager in the radio access network 104.

The base station node 102 comprises a control processor 200, a radio frequency (RF) interface 202, signal processors 204 and a network interface 206. The signal processors 204 may comprise an intermediate frequency (IF) processor 208, a baseband processor 210, and any other suitable processor.

The control processor 200 is operable to send control signals to and receive status and/or response signals from the RF interface 202, the IF processor 208, the baseband processor 210, and the network interface 206. The components 202, 208, 210 and 206 are also operable to communicate signals between each other as necessary. The RF interface 202 is operable to provide an interface between the base station node 102 and the air interface 112 to the wireless communication devices 108-110.

In one embodiment of the present invention, IF processor 208 is operable to provide IF signal processing for IF signals received over the air interface 112, and the baseband processor 210 is operable to provide baseband signal processing for baseband signals received over the air interface 112. Furthermore, either or both of the IF processor 208 and the baseband processor 210 are operable to be dynamically reconfigured with new and/or modified load software to support air interface standards corresponding to the wireless communication devices 108-110 that are requesting communication through the base station node 102.

In another embodiment of the present invention, RF interface 202 may provide direct down-conversion of the signals received over the air interface 112. In such an embodiment, IF processor 208 may be omitted and baseband processor 210 processes baseband signals directly from RF interface 202. Furthermore, in such an embodiment, either or both of the down-conversion processor in RF interface 202 and baseband processor 210 may be dynamically reconfigured with new and/or modified load software to support air interface standards corresponding to the wireless communication devices 108-110 that are requesting communication through the base station node 102.

The signal processors 204 are also operable to perform the physical layer processing for the air interface 112 and are operable to support multiple air interface standards. Either or both of the signal processors 204 may comprise one or more general-purpose processors, digital signal processors (DSPs), field-programmable gate arrays (FPGAs), application-specified standard products (ASSPs), application-specific integrated circuits (ASICs), any other suitable components or a combination of any of these components. The network interface 206 is operable to provide an interface between the base station node 102 and the radio access network 104.

Figure 3:
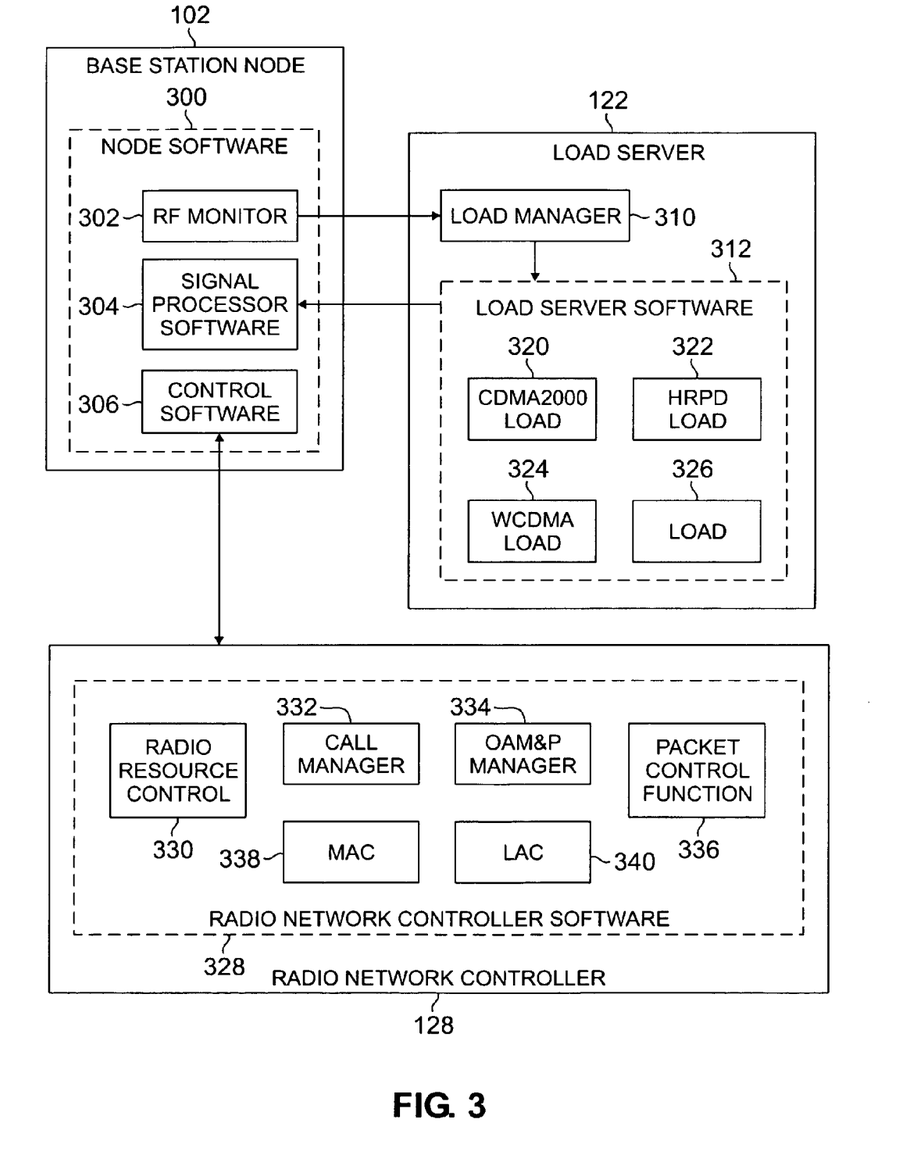
FIG. 3 is a block diagram illustrating portions of one of the base station nodes, the load server and the radio network controller of FIG. 1 according to one embodiment of the present invention.

FIG. 3 is a block diagram illustrating portions of one of the base station nodes 101-103, the load server 122 and the radio network controller 128 according to one embodiment of the present invention. As in FIG. 2, the base station node 102 is illustrated as an example. However, it will be understood that the components illustrated and described with respect to the base station node 102 are also part of the base station nodes 101 and 103.

The base station node 102 comprises node software 300. The node software 300 comprises an RF monitor 302, signal processor software 304, and control software 306. Although illustrated together, it will be understood that the various software 302, 304 and 306 illustrated in the node software 300 may be implemented within any one or more suitable components of the base station node 102.

Any or all of the RF monitor 302, the signal processor software 304, and the control software 306 may comprise logic encoded in media. The logic comprises functional instructions for carrying out program tasks. The media comprises computer disks or other computer-readable media, ASICs, FPGAs, DSPs, other suitable specific or general purpose processors, transmission media or other suitable media in which logic may be encoded and utilized.

RF monitor 302 monitors traffic associated with wireless communication devices 108-110 that are requesting communication through base station node 102 in order to determine which load or loads are being requested for that communication. RF monitor 302 also provides this requested load information to load manager 310. Those familiar with the art will understand that RF monitor 302 searches the wireless communications channels for access requests by communications devices 108-110. RF monitor 302 may be dynamically reconfigured with a new or modified searcher algorithm for monitoring requests for service with one or more air interface standards.

The signal processor software 304 is operable to be dynamically reconfigured with new or modified load software to support air interface standards corresponding to the wireless communication devices 108-110 that are requesting communication through the base station node 102. Thus, the signal processor software 304 may comprise software for either or both of the IF processor 208 and the baseband processor 210.

The control software 306 is operable to provide communication between the base station node 102 and the radio network controller 128. The control software 306 may be operable to receive control signals from and provide status and/or response signals to the radio network controller 128. According to one embodiment, the control software 306 is also operable, based on control signals received from the radio network controller 128, to send control signals to and receive status and/or response signals from the RF interface 202, the IF processor 208, the baseband processor 210, and the network interface 206 of the base station node 102.

The load server 122 may comprise the load manager 310 and also comprises load server software 312. In addition to the option of locating the load manager 310 in the load server 122, it will be understood that the load manager 310 may also be located in the base station node 102, the element manager 120, or any other suitable component of the wireless network 100 without departing from the scope of the present invention.

The load manager 310 is operable to receive requested load information from the RF monitor 302 and to select which one or more loads or modifications to loads are to be provided to the signal processor software 304 of the base station node 102. The load manager 310 is also operable to notify the load server software 312 of the selected loads.

The load server software 312 may comprise a CDMA200 load 320 corresponding to code division multiple access channels according to the IS-2000-C air interface standard, an HRPD load 322 corresponding to an air interface standard using high rate packet data channels, a WCDMA load 324 corresponding to an air interface standard using wideband CDMA channels, an IEEE802.16a load and/or any other loads 326 corresponding to other suitable air interface standards.

The load server software 312 is operable to provide the selected load or loads 320, 322, 324 and/or 326 to the signal processor software 304 of the base station node 102 in order to allow the base station node 102 to communicate with wireless communication devices 108-110 using the standards associated with those loads 320, 322, 324 and/or 326.

In this way, each base station node 101-103 may be dynamically reconfigured based on the corresponding traffic of the wireless communication devices 108-110 that are requesting communication with the base station node 101-103. In addition, each base station node 101-103 may support multiple air interface standards based on the number of loads 320, 322, 324 and/or 326 in that base station node's 101-013 signal processor software 304. Furthermore, each base station node 101-103 may be configured with different loads 320, 322, 324 and/or 326 in accordance with the traffic for the individual base station node 101-103. In addition, each base station node 101-103 may be configured with different software loads that support signaling with, for example, MSC, RNC, or Access Gateway for the supported air interface standard protocols.

The radio network controller 128 comprises radio network controller software 328. According to one embodiment, the software 328 may comprise radio resource control 330, a call manager 332, an operation, administration, maintenance & provision (OAM&P) manager 334, a packet control function 336, medium access control (MAC) 338, and link access control (LAC) 340. However, it will be understood that the software 328 may comprise any other suitable software without departing from the scope of the present invention.

Any or all of the radio resource control 330, the call manager 332, the OAM&P manager 334, the packet control function 336, the MAC 338, and the LAC 340 may comprise logic encoded in media. The logic comprises functional instructions for carrying out program tasks. The media comprises computer disks or other computer-readable media, ASICs, FPGAs, DSPs, other suitable specific or general-purpose processors, transmission media or other suitable media in which logic may be encoded and utilized.

The radio resource control 330 is operable to allocate resources, such as channel elements and the like, to each air interface standard supported by the base station node 102. The call manager 332 is operable to identify requests for service from the base station nodes 101-103 and, for each request, to set up a connection based on the request in accordance with the call control protocol associated with the appropriate air interface standard for that request. The OAM&P manager 334 is operable to provide operation, administration, maintenance and provisioning for the base station nodes 101-103, including any base station node 101-103 that may support multiple air interface standards using different loads 320, 322, 324 and/or 326.

The packet control function 336 is operable to act as a packet switch in order to provide virtual circuit services within the wireless network 100. The MAC 338 is operable to move data packets between components of the wireless network 100 by specifying the basis on which components access a shared medium and the basis on which collisions are avoided. The LAC 340 is operable to provide end-system addressing and error checking in conjunction with the MAC 338 in order to form the data link layer of the open systems interconnection standard.

Figure 4:
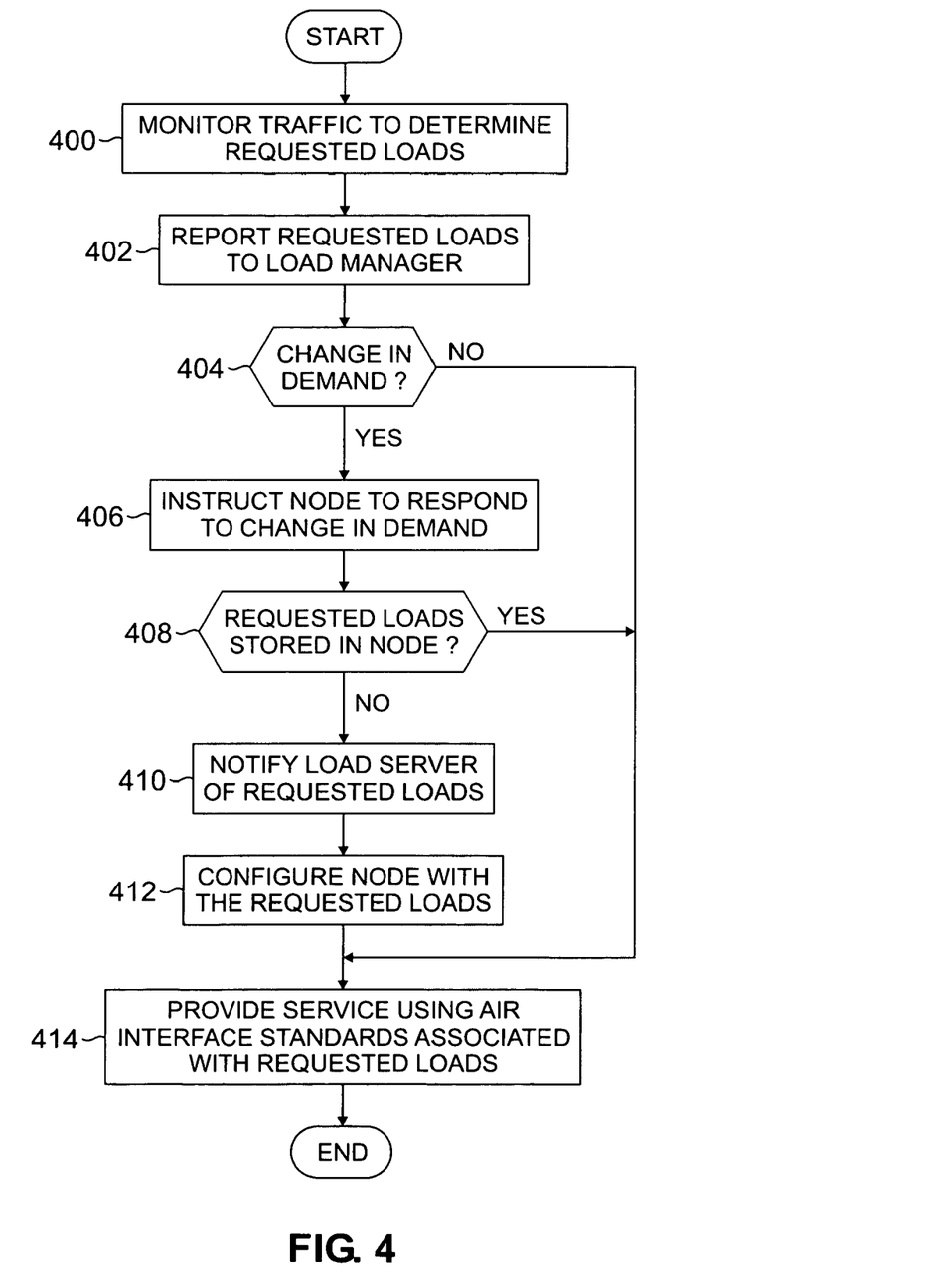
FIG. 4 is a flow diagram illustrating a method for dynamically reconfiguring one of the base station nodes of FIG. 1 based on traffic conditions according to one embodiment of the present invention.

FIG. 4 is a flow diagram illustrating a method for dynamically reconfiguring one of the base station nodes 101-103 based on traffic conditions according to one embodiment of the present invention. As in FIGS. 2 and 3, the base station node 102 is used as an example in the following description. However, it will be understood that the method described with respect to the base station node 102 may be similarly implemented in the base station nodes 101 and 103.

The method begins at step 400 where the RF monitor 302 searches for access request signaling for air interface for the base station node 102 and monitors traffic for the wireless communication devices 108-110 attempting to communicate and/or communicating with the base station node 102 in order to determine requested loads 320, 322, 324 and/or 326 based on the corresponding air interface standards used by the wireless communication devices 108-110. At step 402, the RF monitor 302 reports the requested loads 320, 322, 324 and/or 326 to the load manager 310.

At decisional step 404, the load manager 310 determines whether or not there has been a change in demand based on the report received from the RF monitor 302. If there has been a change in demand, the method follows the Yes branch from decisional step 404 to step 406. At step 406, the load manager 310 instructs the base station node 102 to respond to the change in demand. For example, the load manager 310 may instruct the base station node 102 to modify its load based on the requested loads 320, 322, 324 and/or 326. The load manager 310 may also instruct the base station node 102 to change its resource allocation to match the new demand or respond to the change in demand in any other suitable manner.

At decisional step 408, a determination is made regarding whether or not the requested loads 320, 322, 324 and/or 326 are installed in the base station node 102. This determination may be made by the base station node 102 itself, by the load manager 310 or by any other suitable component of the wireless network 100. If the requested loads 320, 322, 324 and/or 326 are not installed in the base station node 102, the method follows the No branch from decisional step 408 to step 410.

At step 410, the load manager 310 notifies the load server 122 of the requested loads 320, 322, 324 and/or 326. It will be understood that if a component other than the load manager 310 makes the determination regarding whether or not the requested loads 320, 322, 324 and/or 326 are installed in the base station node 102 that the other component will notify the load manager 310 that the requested loads 320, 322, 324 and/or 326 are not installed.

At step 412, the load server 122 configures the base station node 102 with the requested loads 320, 322, 324 and/or 326 by installing those loads in the base station node 102. At step 414, the base station node 102 provides service for the wireless communication devices 108-110 using the air interface standards associated with the requested loads 320, 322, 324 and/or 326, at which point the method comes to an end.

Returning to decisional step 404, if there has been no change in demand, the method follows the No branch from decisional step 404 to step 414, where the base station node 102 continues to provide service for the wireless communication devices 108-110 using the air interface standards associated with the requested loads 320, 322, 324 and/or 326.

Returning to decisional step 408, if the requested loads 320, 322, 324 and/or 326 are installed in the base station node 102, the method follows the Yes branch from decisional step 408 to step 414, where the base station node 102 continues to provide service for the wireless communication devices 108-110 using the air interface standards associated with the requested loads 320, 322, 324 and/or 326.

Figure 5:
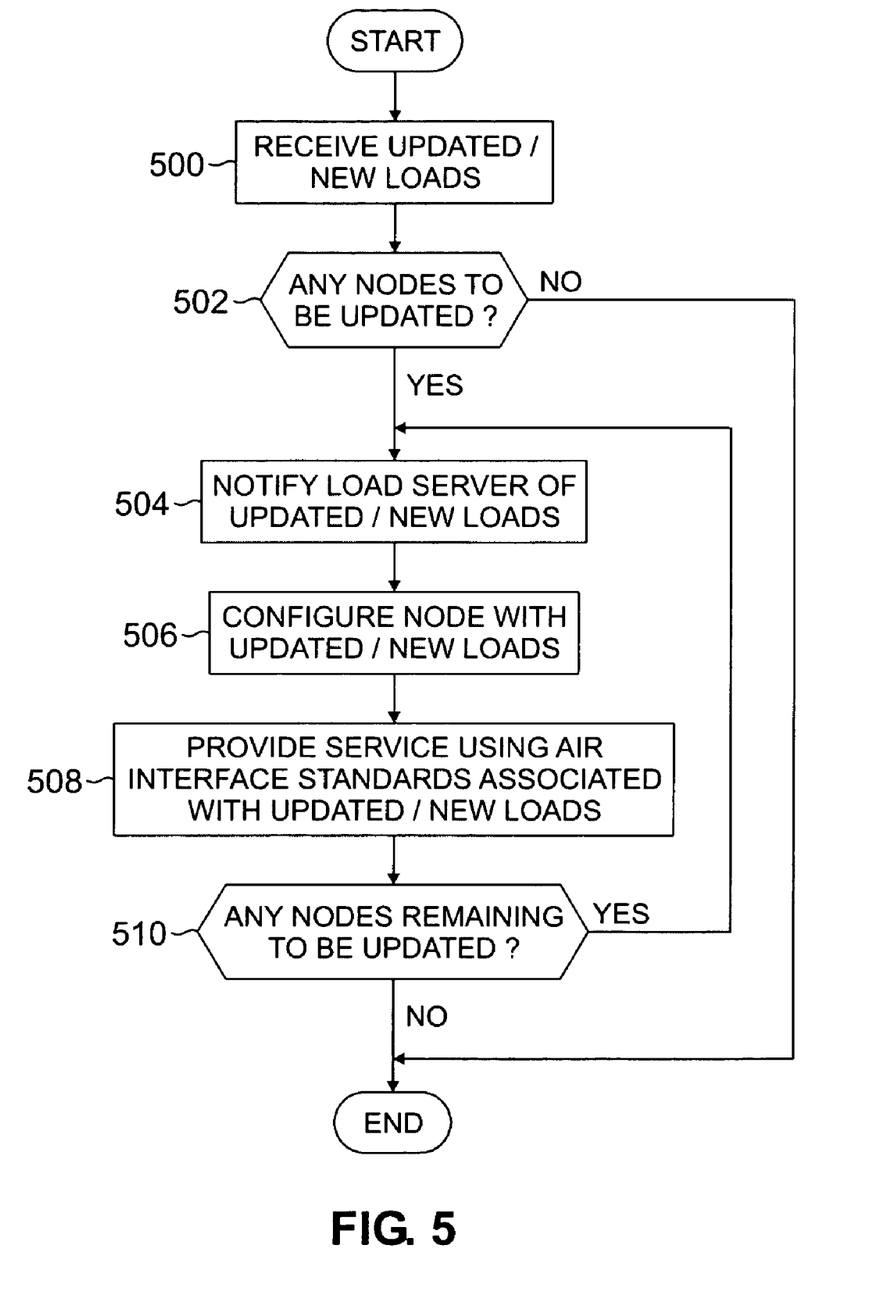
FIG. 5 is a flow diagram illustrating a method for dynamically reconfiguring one of the base station nodes of FIG. 1 based on updated or new air interface standards according to one embodiment of the present invention.

FIG. 5 is a flow diagram illustrating a method for dynamically reconfiguring one of the base station nodes 101-103 based on updated or new air interface standards according to one embodiment of the present invention. The method begins at step 500 where the load server 122 receives one or more updated and/or new loads 320, 322, 324 and/or 326.

At decisional step 502, a determination is made regarding whether or not there are any base station nodes 101-103 to be updated based on the updated/new loads 320, 322, 324 and/or 326. Thus, a determination is made regarding whether or not there are any base station nodes 101-103 in which a load 320, 322, 324 and/or 326 is installed that corresponds to a received updated load 320, 322, 324 and/or 326 or in which a received new load 320, 322, 324 and/or 326 is to be installed. This determination may be made by the base station node 101-103 itself, by the load manager 310 or by any other suitable component of the wireless network 100.

If there are no base station nodes 101-103 to be updated, the method follows the No branch from decisional step 502 and comes to an end. However, if there are any base station nodes 101-103 to be updated, the method follows the Yes branch from decisional step 502 to step 504. At step 504, the load manager 310 notifies the load server 122 of the updated/new loads 320, 322, 324 and/or 326 for one of the base station nodes 101-103 that is to be updated. It will be understood that if a component other than the load manager 310 makes the determination regarding whether or not there are any base station nodes 101-103 to be updated that the other component will notify the load manager 310 which base station nodes 101-103 are to be updated.

At step 506, the load server 122 configures the base station node 101-103 with the updated/new loads 320, 322, 324 and/or 326 by installing those loads 320, 322, 324 and/or 326 in the base station node 101-103. At step 508, the base station node 101-103 may provide service for the wireless communication devices 108-110 using the air interface standards associated with the updated/new loads 320, 322, 324 and/or 326.

At decisional step 510, a determination is made regarding whether or not there are any base station nodes 101-103 remaining to be updated based on the updated/new loads 320, 322, 324 and/or 326. This determination may be made by the base station node 101-103 itself, by the load manager 310 or by any other suitable component of the wireless network 100.

If there are any base station nodes 101-103 remaining to be updated, the method follows the Yes branch from decisional step 510 and returns to step 504, where the load manager 310 notifies the load server 122 of the updated/new loads 320, 322, 324 and/or 326 for another one of the base station nodes 101-103 that is to be updated. However, if there are no base station nodes 101-103 remaining to be updated, the method follows the No branch from decisional step 510 and comes to an end.

Although the present invention has been described with several embodiments, various changes and modifications may be suggested to one skilled in the art. It is intended that the present invention encompass such changes and modifications as fall within the scope of the appended claims.

What is claimed is:

1. For use in a wireless network, a dynamically reconfigurable base station node, comprising:
a radio frequency (RF) monitor configured to monitor traffic associated with a plurality of wireless communication devices to determine at least one requested load having a corresponding air interface standard;
a load manager configured to identify the air interface standard that corresponds to the at least one requested load and to modify load information of the at least one requested load to promote the processing of the requested load, wherein the load manager is further configured to change the resource allocation of the base station node in response to a change in demand created by the at least one requested load; and
at least one signal processor coupled to the RF monitor, the at least one signal processor configured to be dynamically reconfigured to support the air interface standard corresponding to the requested load, and wherein the load manager is further configured to install the requested load into the dynamically reconfigurable base station upon the determination that the requested load is not currently installed in the dynamically reconfigurable base station, and wherein the dynamically reconfigurable base station further is configured to provide a new service based upon the installed requested load.

2. The base station node of claim 1, wherein the RF monitor further is configured to provide requested load information to a load manager, the requested load information identifying the at least one requested load.

3. The base station node of claim 1, wherein the RF monitor further is configured to determine at least two requested loads, each requested load having a unique corresponding air interface standard.

4. The base station node of claim 1, wherein the at least one signal processor comprises one of an intermediate frequency (IF) processor and a baseband processor.

5. The base station node of claim 1, wherein the at least one signal processor comprises an intermediate frequency (IF) processor and a baseband processor.

6. A wireless network comprising a plurality of wireless communication devices, the wireless network comprising:
at least one dynamically reconfigurable base station node, comprising:
a radio frequency (RF) monitor configured to monitor traffic associated with the wireless communication devices to determine at least one requested load having a corresponding air interface standard,
at least one signal processor coupled to the RF monitor, the at least one signal processor configured to be dynamically reconfigured to support the air interface standard corresponding to the requested load; and
a load manager configured to communicate with the base station node, the RF monitor further configured to provide requested load information to the load manager, the requested load information identifying the at least one requested load, wherein the load manager is configured to modify load information and dynamically reconfigure the resource allocation of the base station node based on the requested load information, and wherein the load manager is further configured to install the requested load into the dynamically reconfigurable base station upon the determination that the requested load is not currently installed in the dynamically reconfigurable base station, and wherein the dynamically reconfigurable base station further is configured to provide a new service based upon the installed requested load.

7. The wireless network of claim 6, further comprising a load server and an element manager, the load manager located in one of the load server, the base station node and the element manager.

8. The wireless network of claim 7, wherein the load manager further is configured to select which one or more loads to provide to the base station node based on the requested load information and to notify the load server of the selected loads.

9. The wireless network of claim 7, further comprising a radio access network and a core network, the load server located in one of the radio access network and the core network.

10. The wireless network of claim 6, wherein the RF monitor further is configured to determine at least two requested loads, each requested load having a unique corresponding air interface standard.

11. The wireless network of claim 6, wherein the at least one signal processor comprises one of an intermediate frequency (IF) processor and a baseband processor.

12. The wireless network of claim 6, wherein the at least one signal processor comprises an intermediate frequency (IF) processor and a baseband processor.

13. The wireless network of claim 6, further comprising at least two base station nodes, each of the base station nodes comprising at least one signal processor configured to be dynamically reconfigured to support the air interface standard corresponding to the requested load for that base station node such that each of the base station nodes is configured to support different air interface standards.

14. For use in a wireless network comprising at least one dynamically reconfigurable base station node and a plurality of wireless communication devices, a method for reconfiguring the base station node, the method comprising:
    monitoring traffic for the wireless communication devices to determine requested loads, each requested load having a corresponding air interface standard;
    determining whether the requested loads are installed in the base station node;
    modifying the requested loads;
    changing the resource allocation of the base station based upon the requested loads;
    configuring the base station node with the requested loads by installing the requested loads in the base station node when the requested loads are not installed in the base station node; and
    providing a new service based upon the installed requested load.

15. The method of claim 14, further comprising reporting the requested loads to a load manager.

16. The method of claim 14, wherein determining whether the requested loads are installed in the base station node comprises determining whether the requested loads are installed in the base station node in one of the base station node and a load manager.

17. The method of claim 14, further comprising notifying a load server of the requested loads.

18. The method of claim 14, further comprising providing service for the wireless communication devices using the air interface standards corresponding to the requested loads.

19. For use in a wireless network comprising a plurality of dynamically reconfigurable base station nodes and a plurality of wireless communication devices, a method for reconfiguring the base station nodes, the method comprising:
    receiving at least one of an updated and a new load, each received load having a corresponding air interface standard;
    determining whether any of the base station nodes are to be updated based on the received load;
    transmitting information relating to the load to the base station node with the received load;
    changing the resource allocation of the base station based upon the requested loads;
    configuring the base station node with the received load by installing the received load in the base station node when the received load is not installed in the base station node; and
    providing a new service based upon the installed received load.

20. The method of claim 19, wherein determining whether any of the base station nodes are to be updated based on the received loads comprises determining whether any of the base station nodes have a load installed corresponding to a received updated load.

21. The method of claim 19, wherein determining whether any of the base station nodes are to be updated based on the received loads further comprises determining whether any of the base station nodes is to have a received new load installed.

22. The method of claim 19, wherein determining whether any of the base station nodes are to be updated based on the received loads comprises determining whether any of the base station nodes are to be updated in one of the base station node and a load manager.

23. The method of claim 19, further comprising providing service for the wireless communication devices using the air interface standard corresponding to the received load.

* * * * *